United States Patent
Tenhaeff (10) Patent No.: US 10,850,329 B2
(45) Date of Patent: Dec. 1, 2020

(54) USE OF A PART IN CHASSIS OF MOTOR VEHICLES

(71) Applicant: Bayerische Motoren Werke Aktiengesellschaft, Munich (DE)

(72) Inventor: Katja Tenhaeff, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 163 days.

(21) Appl. No.: 16/108,983

(22) Filed: Aug. 22, 2018

(65) Prior Publication Data

US 2018/0361481 A1 Dec. 20, 2018

Related U.S. Application Data

(63) Continuation of application No. PCT/EP2017/051206, filed on Jan. 20, 2017.

(30) Foreign Application Priority Data

Feb. 23, 2016 (DE) .................. 10 2016 202 755

(51) Int. Cl.
*B22F 7/08* (2006.01)
*B60G 7/00* (2006.01)
(Continued)

(52) U.S. Cl.
CPC ............. *B22F 7/08* (2013.01); *B33Y 10/00* (2014.12); *B33Y 80/00* (2014.12); *B60G 7/001* (2013.01);
(Continued)

(58) Field of Classification Search
CPC ........ B22F 7/08; B22F 2999/00; B33Y 10/00; B33Y 80/00; C22C 47/20; C22C 47/062;
(Continued)

(56) References Cited

U.S. PATENT DOCUMENTS

| 6,869,091 B1 * | 3/2005 | Anderson | B60G 7/001 |
| | | | 280/124.164 |
| 7,186,948 B1 * | 3/2007 | Gordon | B23K 26/03 |
| | | | 219/121.85 |

(Continued)

FOREIGN PATENT DOCUMENTS

| DE | 10017205 A1 * | 10/2001 | ........ B62D 29/001 |
| DE | 101 15 477 A1 | 10/2002 | |

(Continued)

OTHER PUBLICATIONS

Machine Translation of DE-102014005010 (Year: 2014).*

(Continued)

*Primary Examiner* — James A English
*Assistant Examiner* — Kurtis Nielson
(74) *Attorney, Agent, or Firm* — Crowell & Moring LLP (57) ABSTRACT

A chassis of a motor vehicle, having at least one part that consists of a metal material and absorbs or transmits forces, at least one tape-shaped reinforcing element that consists of a fiber-reinforced metal matrix being applied to the surface of the part by thermal joining in the broadest sense. Chassis, which are of different motor-vehicle types in terms of their weight and/or their drive power and the same part, in terms of its geometric dimensions, that absorbs or transmits said forces, are characterized in that, when used in a motor-vehicle type with a higher weight and/or a greater drive power, a reinforcing element is applied to at least one surface portion, forming a load path, of this part, which reinforcing element is either not provided at all or is provided in a smaller size in a different motor-vehicle type with a lower weight and/or lower drive power.

8 Claims, 8 Drawing Sheets

(51) Int. Cl.
*B60G 13/00* (2006.01)
*B62D 21/11* (2006.01)
*C22C 47/06* (2006.01)
*C22C 47/20* (2006.01)
*B33Y 80/00* (2015.01)
*B33Y 10/00* (2015.01)

(52) U.S. Cl.
CPC .............. *B60G 13/00* (2013.01); *B62D 21/11* (2013.01); *C22C 47/062* (2013.01); *C22C 47/20* (2013.01); *B22F 2999/00* (2013.01); *B60G 2206/013* (2013.01); *B60G 2206/10* (2013.01); *B60G 2206/11* (2013.01); *B60G 2206/124* (2013.01); *B60G 2206/50* (2013.01); *B60G 2206/604* (2013.01); *B60G 2206/71* (2013.01); *Y02P 10/25* (2015.11)

(58) Field of Classification Search
CPC ........ B62D 21/11; B60G 13/00; B60G 7/001; B60G 2206/10; B60G 2206/604; B60G 2206/50; B60G 2206/71; B60G 2206/124; B60G 2206/11; B60G 2206/013; Y02P 10/295
USPC ................................... 280/124.109
See application file for complete search history.

(56) References Cited

U.S. PATENT DOCUMENTS

| | | | | |
|---|---|---|---|---|
| 9,650,083 | B2* | 5/2017 | Graefe | B62D 21/11 |
| 2004/0135400 | A1 | 7/2004 | Matsuzaki et al. | |
| 2006/0254744 | A1 | 11/2006 | Gordon et al. | |
| 2006/0255623 | A1 | 11/2006 | Haller | |
| 2009/0001681 | A1* | 1/2009 | Morales Arnaez | B60G 7/001 280/124.134 |
| 2012/0280534 | A1* | 11/2012 | Eipper | B62D 29/005 296/187.01 |
| 2013/0154310 | A1 | 6/2013 | Neumann et al. | |
| 2015/0158361 | A1* | 6/2015 | Eismann | B60G 7/001 280/124.116 |
| 2016/0101660 | A1* | 4/2016 | Wolf-Monheim | B60G 7/00 280/124.125 |
| 2017/0217502 | A1* | 8/2017 | Tenhaeff | B29C 35/02 |
| 2018/0154719 | A1* | 6/2018 | Kwon | F16C 11/06 |

FOREIGN PATENT DOCUMENTS

| | | | | |
|---|---|---|---|---|
| DE | 100 17 205 B4 | 7/2006 | | |
| DE | 603 10 339 T2 | 5/2007 | | |
| DE | 10 2011 051 115 A1 | 12/2012 | | |
| DE | 10 2014 005 010 A1 | 11/2014 | | |
| DE | 102014005010 A1 * | 11/2014 | | B62D 21/11 |
| DE | 10 2013 021 378 A1 | 6/2015 | | |
| DE | 10 2013 225 939 A1 | 6/2015 | | |
| DE | 20 2014 101 418 U1 | 8/2015 | | |
| EP | 1 724 132 A1 | 11/2006 | | |
| EP | 1 724 131 B1 | 5/2010 | | |
| EP | 2 578 473 A1 | 4/2013 | | |
| GB | 2509245 A | 6/2014 | | |
| WO | WO 2005/053884 A1 | 6/2005 | | |
| WO | WO 2016/083007 A1 | 6/2016 | | |

OTHER PUBLICATIONS

Machine Translation of DE-10017205 (Year: 2001).*
International Search Report (PCT/ISA/210) issued in PCT Application No. PCT/EP2017/051206 dated May 22, 2017 with English translation (six (6) pages).
German-language Written Opinion (PCT/ISA/237) issued in PCT Application No. PCT/EP2017/051206 dated May 22, 2017 (seven (7) pages).
German-language Search Report issued in counterpart German Application No. 102016202755.7 dated Apr. 26, 2016 with partial English translation (ten (10) pages).
Gordon, "Selective Reinforcement Using Metal Matrix Composite Prepreg and Ultrasonic Additive Manufacturing", Aeromat, May 13, 2015, XP008184465 (one (1) pages).

* cited by examiner

Fig. 8

USE OF A PART IN CHASSIS OF MOTOR VEHICLES

CROSS REFERENCE TO RELATED APPLICATIONS

This application is a continuation of PCT International Application No. PCT/EP2017/051206, filed Jan. 20, 2017, which claims priority under 35 U.S.C. § 119 from German Patent Application No. 10 2016 202 755.7, filed Feb. 23, 2016, the entire disclosures of which are herein expressly incorporated by reference.

BACKGROUND AND SUMMARY OF THE INVENTION

The present invention relates to the use of at least one part in chassis of motor vehicles, which part consists of a metal material and absorbs or transmits forces, and to a chassis using such a part as well as to a method for producing a corresponding vehicle chassis. EP 1 724 131 B1, DE 100 17 205 B4, DE 10 2014 005 010 A1 and also DE 101 15 477 A1 and DE 10 2011 051 115 A1 are mentioned as prior art.

In motor vehicles according to the prior art, chassis components are manufactured mainly from metal materials. Use is made here especially of casting and forming methods. In this case, the components are to some extent constructed and adapted separately for each vehicle type. In addition, however, use is also made of what are known as construction kits, wherein identical parts are used for different vehicle types. Thus, if a particular construction kit is stipulated, several vehicle derivatives or types, the chassis components of which have substantially identical geometric dimensions, can be covered by a single, identical part. Since the different vehicle types or derivatives usually differ in terms of their drive power and/or their weight, it is necessary to design these identical components with regard to their use in that vehicle type that results in the greatest loading of the part. Usually, this is a derivative with a greater drive power and/or a higher weight. Consequently, the particular component or said identical part is overdimensioned for a different vehicle derivative (with a lower drive power and/or a lower weight). This is undesirable for example for reasons of weight.

In the case of separate manufacture of components of the chassis, in contrast to the use of construction kit systems, high costs arise for the construction, planning, acquisition of production means and the ensuing logistics. By contrast, when construction kits are used, the above-described overdimensioning often occurs, resulting in material consumption that is ideally to be avoided and in an increase in weight. Moreover, consideration needs to be given to the fact that, in the manufacture of metal components, modifications at late development stages or shortly before the start of series production can be effected only with great difficulty and high costs. Especially in the case of forming manufacturing methods that are broadly speaking cost-effective for large piece numbers, reinforcements of load paths in the component can be introduced in a targeted manner only with a great deal of effort.

Examples of reinforcements in the chassis region of vehicles are shown in the first three documents mentioned at the beginning. Thus, EP 1 724 132 B1 describes a cross member of a torsion beam axle, on which a reinforcing metal mesh has partially been attached. For affixing, said metal mesh can be secured by spot welding. In the prior art according to DE 100 17 205 B4, reinforcing carbon fibers have been introduced into the elbow portion of an aluminum sickle-shaped wheel-controlling control arm by ultrasonic welding. Moreover, DE 10 2014 005 010 A1 describes an axle carrier having forged-in reinforcing elements made of fiber-reinforced plastic. Finally, DE 101 15 477 A1 is also mentioned as prior art, which describes a vehicle steering-wheel part produced from a metal matrix with reinforcement fibers distributed therein. It can be gathered from DE 10 2011 051 115 A1 that such metal-matrix composite materials cause excessively high manufacturing costs.

An object of the present invention is to provide a chassis for a vehicle or different vehicle types (as a construction-kit system), which can be operated durably while being cost-effective to produce and fit. In particular, the conflict between cost-effect production, lightweight construction and stiffness is intended to be resolved. Furthermore, it is an object of the present invention to provide a corresponding method for producing the chassis. The object is achieved by the features of the independent claims. The dependent claims relate to advantageous configurations of the invention.

Therefore, the invention is achieved by the use of a part in chassis of motor vehicles and by a chassis of a motor vehicle, in which the metal part (or a profiled component) is used, which part absorbs or transmits forces and is reinforced sectionally by at least one tape-like reinforcing element, consisting of a fiber-reinforced metal matrix, applied to the surface of the part. By way of example, the chassis comprises an axle carrier. The axle carrier in turn comprises a longitudinal member. The longitudinal member can consist of or be assembled from one or more metal profiled components. These individual profiled components or parts, as they are known, can, for example in a longitudinal member, be tubular or shell-like metal parts that are welded or screwed together to form the longitudinal member. In the scope of the invention, provision is made for a tape-shaped and, thus, two-dimensional reinforcing element formed from a fiber-reinforced metal matrix to be applied to at least one corresponding part or profiled component of the chassis, specifically by thermal joining in the broadest sense. This joining usually takes place under a certain contact pressure. As a result of said thermal joining, an intimate connection is created between the part to be reinforced locally (which absorbs or transmits forces) and the tape-like reinforcing element applied locally thereto.

As far as the tape form of the reinforcing element is concerned, this means that it is an elongate and two-dimensional tape (of low height, a certain length and usually a smaller width compared therewith), which is applied for reinforcement in the present case; according to Duden, a further exemplary application of a tape (German: Band) would be that of holding together. In this case, a reinforcing element provided according to the invention can contain substantially only reinforcement fibers that are embedded in a metal material forming the metal matrix. Such embedding can be constituted for example by melt impregnation of the reinforcement fibers, which can for example be interwoven. In this case, what is known as infiltration with molten metal is also possible, cf. for example DE 10 2013 225 939 A1.

Alternatively, a reinforcing element provided according to the invention can also be formed by a hybrid-yarn semifinished product, which, in addition to the reinforcement fibers, exhibits fibers made of a metal material that form the metal matrix. Here, the tape-shaped reinforcing element as such, before the application according to the invention, consists virtually only of fibers that are connected together in a suitable manner, wherein metal fibers are present, which, as a result of the application to the chassis part or the thermal joining (in the broadest sense), form said metal matrix therewith, in which the other reinforcement fibers are then embedded. Said fibers can be connected together before application of the reinforcing element for example by weaving, knitting or braiding, wherein, in the last-mentioned case, a resultant tubular structure still has to be cut open in order to obtain a desired spread-out, i.e. substantially two-dimensional semifinished product.

Returning to chassis parts that are locally reinforced according to the invention, it also possible, however, for other metal parts (other than those mentioned above by way of example) in the chassis of a motor vehicle to be designed in a corresponding manner, i.e. provided locally on their surface with at least one fiber-reinforced metal reinforcing element, which is applied in particular in the region of, or along what is known as, a load path by thermal joining (in the broadest sense). The expression load path is familiar to engineers. Metal parts (that absorb or transmit forces) reinforced according to the invention by means of a reinforcing element can have an open or closed cross section. Tape-shaped, two-dimensional reinforcing elements according to the invention can be placed on the outside of the closed cross section or on the inside in the case of open cross sections. By way of such reinforcing elements, in particular the strength and stiffness, but also the acoustic behavior and the vibration behavior of the particular part or profiled component, can be adapted as desired.

The application of such reinforcing elements is relatively cost-effective in the production process of the chassis. The costly tools, in particular for the formed metal parts of a chassis of a complete construction kit can remain unchanged in this case. Thus, it is in particular easily possible according to the invention to provide a said part, which is intended to be installed, with identical geometric dimensions, on motor-vehicle types that differ in terms of their weight and/or their drive power, with a reinforcing element on at least one surface portion that forms a load path, when it is used in a motor-vehicle type with a higher weight and/or a greater drive power. The reinforcing element, in the case of another motor-vehicle type with a lower weight and/or a lower drive power, either is not provided on said part at all or is provided thereon with smaller dimensions (in terms of height/thickness or width or length) and/or a smaller fiber content.

It has already been mentioned that said part, which is reinforced locally or as required by a reinforcing element, can be an axle carrier. At this point, it is expressly pointed out that reinforcement, provided only in some vehicle types or derivatives, of what is known as a "construction-kit" part is only one possible application. In principle, provision can also be made for a particular metal chassis element to be provided locally on a surface portion with a reinforcing element made of a fiber-reinforced metal material in a manner according to the invention for use in any vehicle type in which this part is installed. In particular, this reinforcing element then lies along a load path extending through this part.

A reinforcing element provided according to the invention is described as tape-shaped and also as two-dimensional. The latter adjective or feature expresses the fact that the height or thickness, measured perpendicularly to that surface of said part to which the reinforcing element is applied, of the reinforcing element is significantly less than the extension thereof in terms of length and width, i.e. measured virtually along or parallel to said surface. On the other hand, said tape form makes it possible to apply the reinforcing element to said surface in practice in a similar manner to an adhesive tape or the like. In particular, a suitable preferably robot-controlled application device can be used for this purpose. In this connection, provision can also be made to apply the reinforcing element to the particular component in a slightly adhering manner, i.e. by way of an adhesive layer, before said thermal joining (in the broadest sense).

As far as the thermal joining of a reinforcing element that is applied to a profiled component or part in the chassis region of a vehicle and consists of a fiber-reinforced metal matrix is concerned, this takes place under a certain contact pressure in order to ensure the desired reinforcing action. Although virtually any desired thermal joining methods can be used, a proposed particularly preferred method is what is known as "ultrasonic additive manufacturing", wherein ultrasonic vibrations are used in conjunction with a laser for partially heating the mutually facing metal surfaces of the component to be reinforced and of the reinforcing element. On account of the ultrasonic vibrations, only relatively little energy input by the laser is required and the ultrasonic vibrations, in particular of the reinforcing element, at the same time ensure the best-possible cohesive connection between said part and the reinforcing element.

As regards "ultrasonic additive manufacturing", reference can be made for example to the presentation "Ultrasonic additive manufacturing: A hybrid production process for novel functional products" by R. J. Friela and R. A. Harrisa at the 17th CIRP Conference on Electro Physical and Chemical Machining (ISEM).

Otherwise, in addition to the cohesive connection, a form fit between the reinforcing element and said metal part can be provided. Such a form fit can be formed for example by the provision of structuring (=elevations or depressions) or by pins or pegs or the like in each part to be reinforced.

A reinforcing element according to the invention is formed in particular by a fiber-reinforced tape. This is formed by a metal matrix in which reinforcing fibers are provided. Preferably, these fibers, which consist preferably of carbon or are formed by a ceramic material, are oriented unidirectionally. In addition, however, the reinforcing fibers can also consist of glass or a metal material which differs from the metal matrix of the reinforcing element as regards material characteristics that are established or relevant for the particular load. Such fiber-reinforced tapes can then be applied in a suitable manner to said metal parts at the appropriate points, i.e. in particular along a load path (of forces to be transmitted or absorbed by the particular part). The metal material of the part reinforced according to the invention can in this case be for example an aluminum alloy or steel.

In addition to an axle carrier, it is also possible for any wheel attachment components to be reinforced in a manner according to the invention. As is known, the wheels of the vehicle are ultimately connected to the body of the vehicle via, in this case, what are known as wheel attachment components, such that the body is supported on the wheels. Such wheel attachment components can, in addition to a wheel carrier, be a pivot bearing or steering knuckle, but also wheel-controlling links such as longitudinal link, transverse link, tie bar or a vibration damper, wherein in particular a metal damper tube of the latter can be reinforced in a manner according to the invention. The abovementioned wheel attachment components also represent chassis parts or profiled components made of metal here, which are stiffened or reinforced by reinforcing elements. A further example is what is known as a shear panel, which is known to a person skilled in the art and usually connected releasably both to the axle carrier and to the body of the vehicle, said shear panel serving for stiffening in the chassis region of a motor vehicle and being or having a said metal part with a reinforcing element attached by thermal joining or welding.

The reinforcing element formed by at least one tape or a plurality of tapes applied on top of one another, which for its/their part contain(s) a multiplicity of in particular unidirectional reinforcement fibers, can also be formed by wrapping the part to be reinforced. Such wrapping of a tape can take place in a crosswise manner, i.e. in an intersecting manner, such that the reinforcement fibers of the multiply superposed unidirectional tape cross multiple times. With respect to a longitudinal extent of the metal part, the reinforcement fibers can enclose for example an angle in the order of magnitude between 15° and 165° alternately therewith, namely in a manner wrapped in a superposed manner. For example, the (superposed) layer order can be designed such that all reinforcement fibers are first of all wrapped in a first direction (for example at 15°) and then all reinforcement fibers are wrapped in a second direction (for example at 165°); alternatively, an alternately changed fiber orientation (for example 25°, 155°, 15°, 165°, etc.) is also possible in order to form a mesh. Of course, wrappings composed in a piecewise manner or only partial wrappings are also possible, and a preferred thickness of the reinforcing element formed by wrapped reinforcement fibers with metal matrix is in the order of magnitude of 0.5 millimeter to 5 mm.

The reinforcing elements can be used to reinforce specific load paths, and also to extensively reinforce a surface with a suitable orientation of the fiber direction. As a result of the application of the reinforcing elements, not only the stiffness but also the acoustic properties can be set in a targeted manner by the local-dynamic stiffness of said part (with reinforcing element) being changed. As a result, chassis components can be scaled easily, i.e. adapted to different vehicle types. Thus, a component can be adapted to a particular vehicle model or an engine variant or country variant by individual reinforcement by means of the reinforcing elements, or be rendered capable thereof in the event of any change. Thus, it is possible, for example in a construction-kit system, for components to be adapted to the particular vehicle model in a unified manner and subsequently as synergistic parts by the use of the reinforcing elements. The reinforcing elements make it possible to design prototype vehicles for a construction-kit component with smaller dimensions and to scale up missing functions such as stiffnesses for example for other derivatives. By way of the adaptability, it is possible to cover several derivatives with a single metal basic component (as said part).

As a result of the reduction in necessary production variants, the costs for tooling and machines and the logistical effort are reduced. As a result of the use of the reinforcing elements, the components of the chassis can be adapted better to the particular demands. Thus, it is possible to support load paths in a targeted manner through targeted exploitation of the anisotropy of the fibers on account of the high mechanical properties in the fiber direction. In this way, the component weight can be further optimized and material excess avoided. Furthermore, the use of the applied tapes allows uncomplicated adaptation of the chassis components to any change. Thus, production sequences can be adapted easily to stipulated changes or to other components, without generating high costs for converting the tool adaptation.

Other objects, advantages and novel features of the present invention will become apparent from the following detailed description of one or more preferred embodiments when considered in conjunction with the accompanying drawings.

DETAILED DESCRIPTION OF THE DRAWINGS

In the following text, FIGS. 1 to 8 are used to describe various components of a chassis 1 of a motor vehicle, which each have or are metal parts that are mechanically reinforced in accordance with the invention by a reinforcing element 5 that consists of a metal matrix having embedded carbon fibers or ceramic fibers and has been applied to the metallic part surface by thermal joining.

Figure 1:
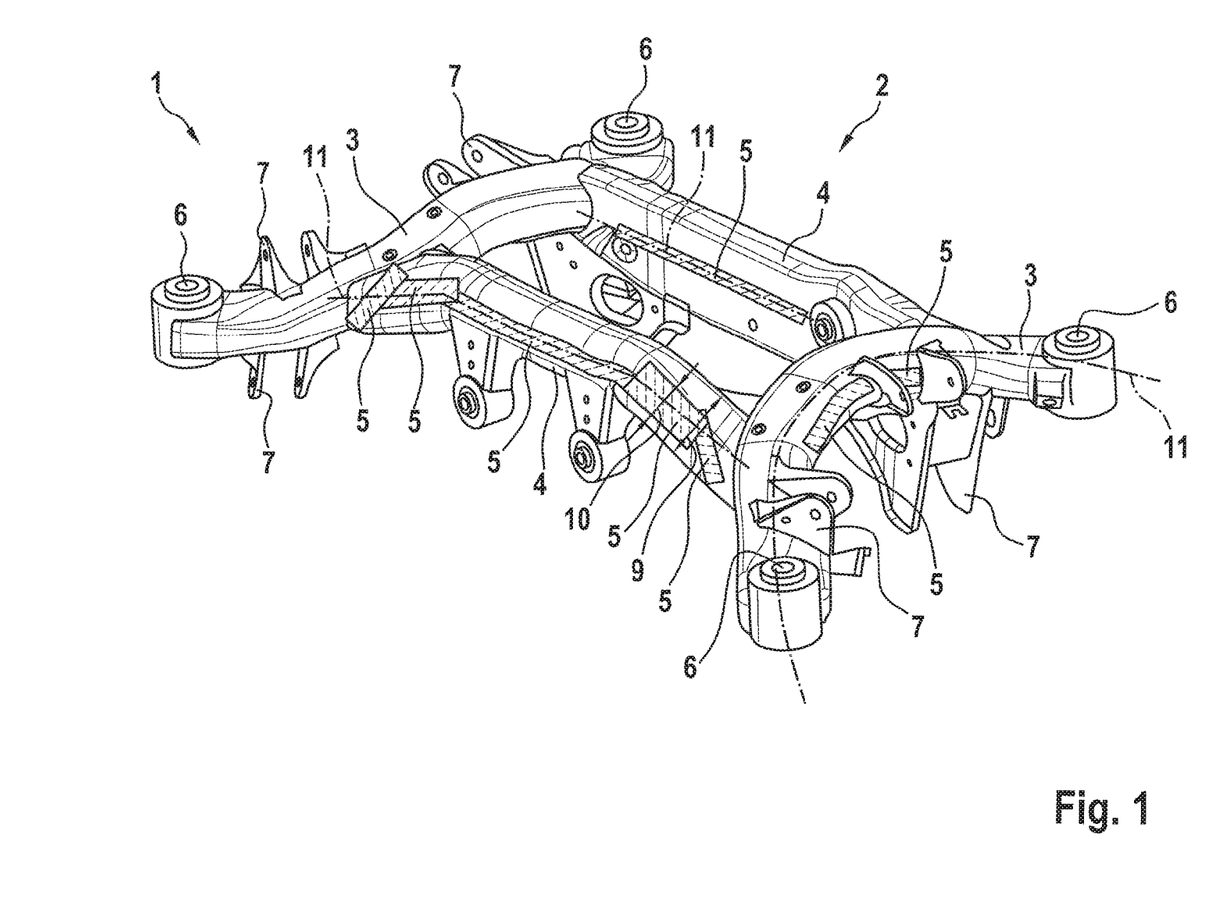
FIG. 1 shows a rear axle carrier of the chassis according to the invention according to one exemplary embodiment.

FIG. 1 shows an axle carrier 2, to be more precise a rear axle carrier, of the chassis 1. According to FIG. 1, the axle carrier 2 comprises two longitudinal members 3 and two cross members 4, which connect the two longitudinal members 3 together. On the axle carrier 2 there are at least four body attachment points 6. Via these body attachment points 6, the axle carrier 2 is connected to a body (not shown) of the motor vehicle.

Formed laterally on the longitudinal members 3 are wheel attachment points 7. Fastened at these wheel attachment points 7 are wheel attachment components, for example a transverse link 8 from FIG. 4. These wheel attachment components connect the vehicle wheel (not shown), which is mounted in a rotatable manner on a wheel carrier, as usual, as it were to the rear axle carrier 2 or the vehicle body.

The axle carrier 2 is produced from metal, for example aluminum or steel. For local stiffening and optionally for adaptation of further properties, a plurality of reinforcing elements 5 according to the invention have been applied to the cross members 4 and the longitudinal members 3 in the exemplary embodiment shown. These reinforcing elements 5 are each formed by metal tapes (likewise reference numeral 5) with integrated unidirectional reinforcement fibers. As a result of the action of heat introduced preferably by use of a laser, and of ultrasonic vibrations and low pressure, the metal matrix of the tape(s) 5 was fused with the material of the axle carrier 2, wherein, at the same time, a sufficiently firm connection to the particular metal part, namely the longitudinal member 3 or the cross member 4, arose.

Figure 2:
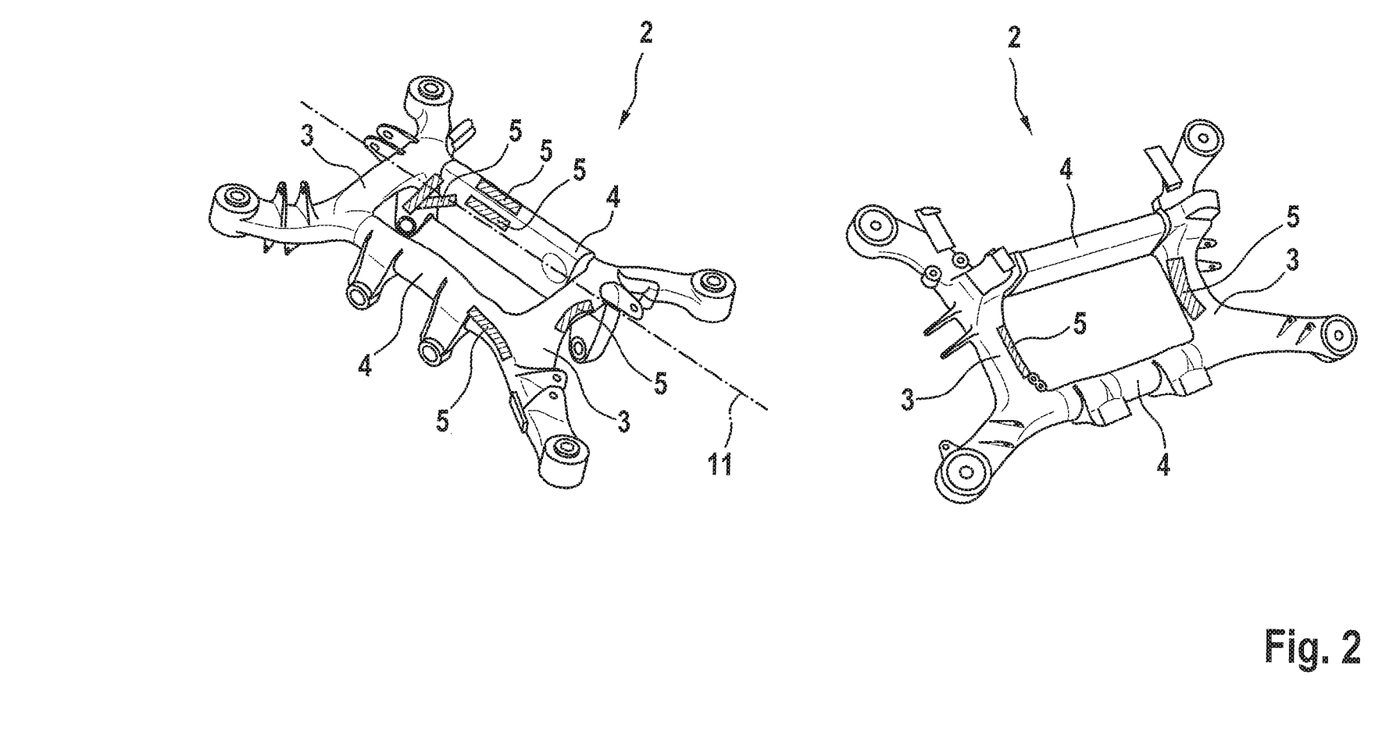
FIG. 2 shows a further rear axle carrier in a view from above and from below.

FIG. 2 likewise shows, in two views, an axle carrier 2 (rear axle carrier) with short reinforcing elements 5 for local stiffening on the longitudinal member 3 and/or cross member 4. On a rear axle carrier, the reinforcing elements 5 can also serve to improve the acoustic properties, in particular with regard to the transmission of the excitations of a rear axle transmission, fastened to the rear axle carrier, of the motor vehicle.

Figure 3:
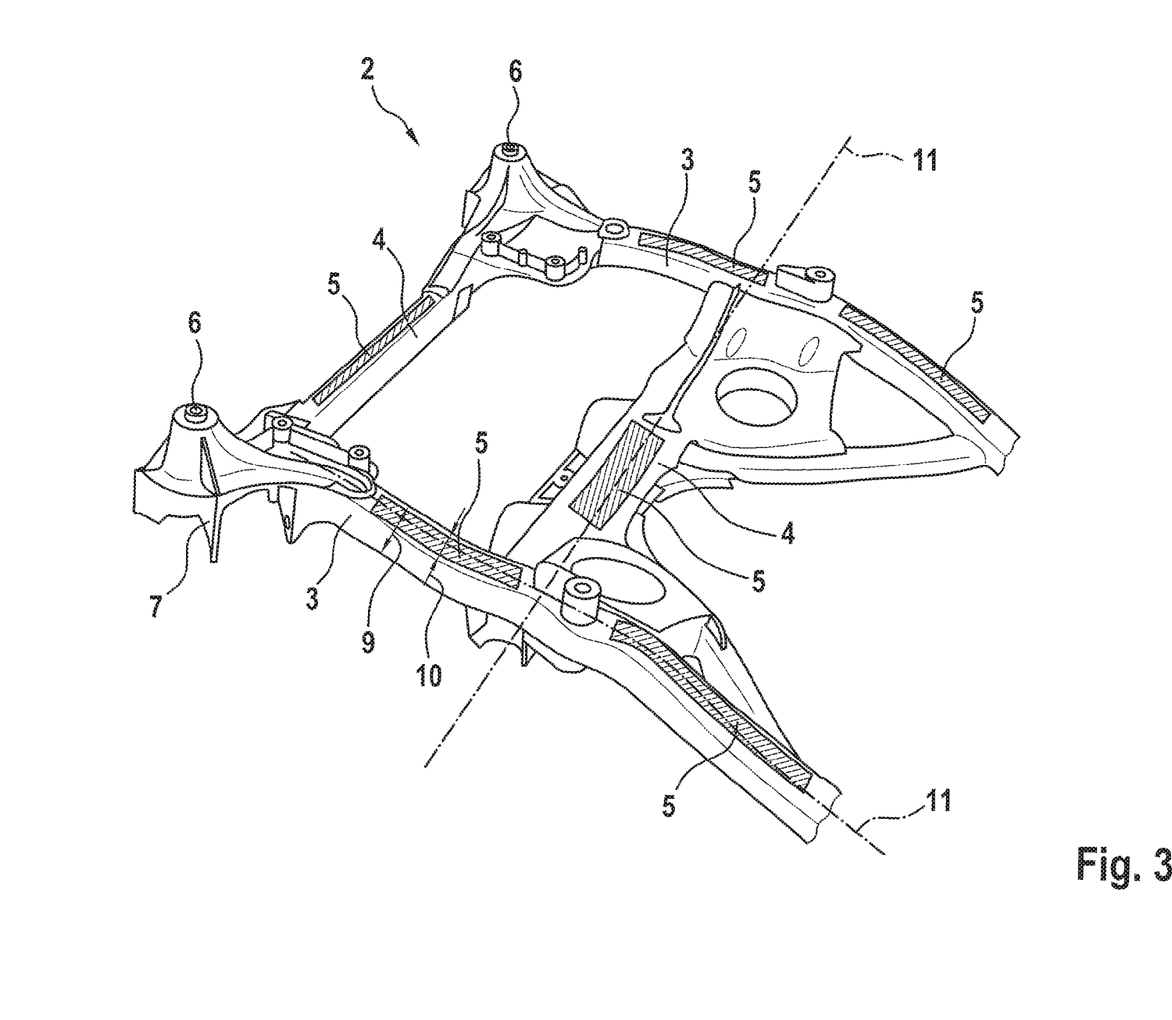
FIG. 3 shows a front axle carrier of a chassis.
Figure 4:
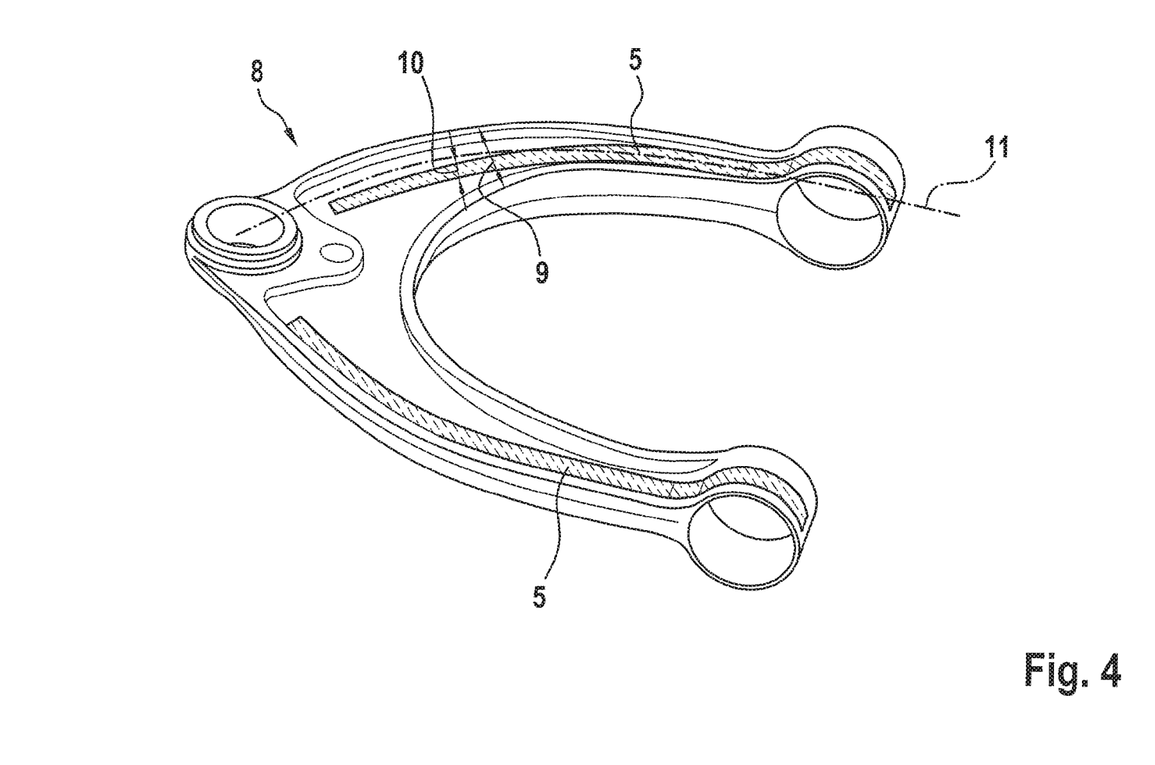
FIG. 4 shows a triangular transverse link of a chassis.
Figure 5:
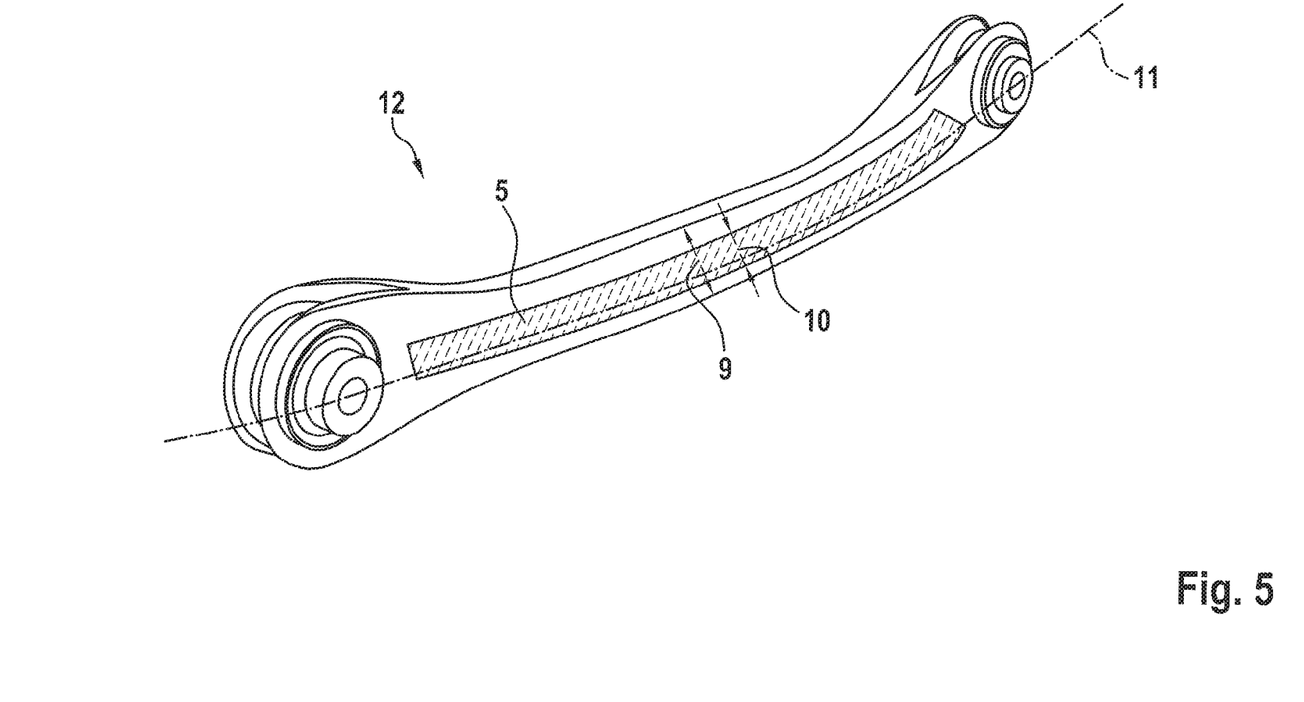
FIG. 5 shows a 2-point link of a chassis.
Figure 6:
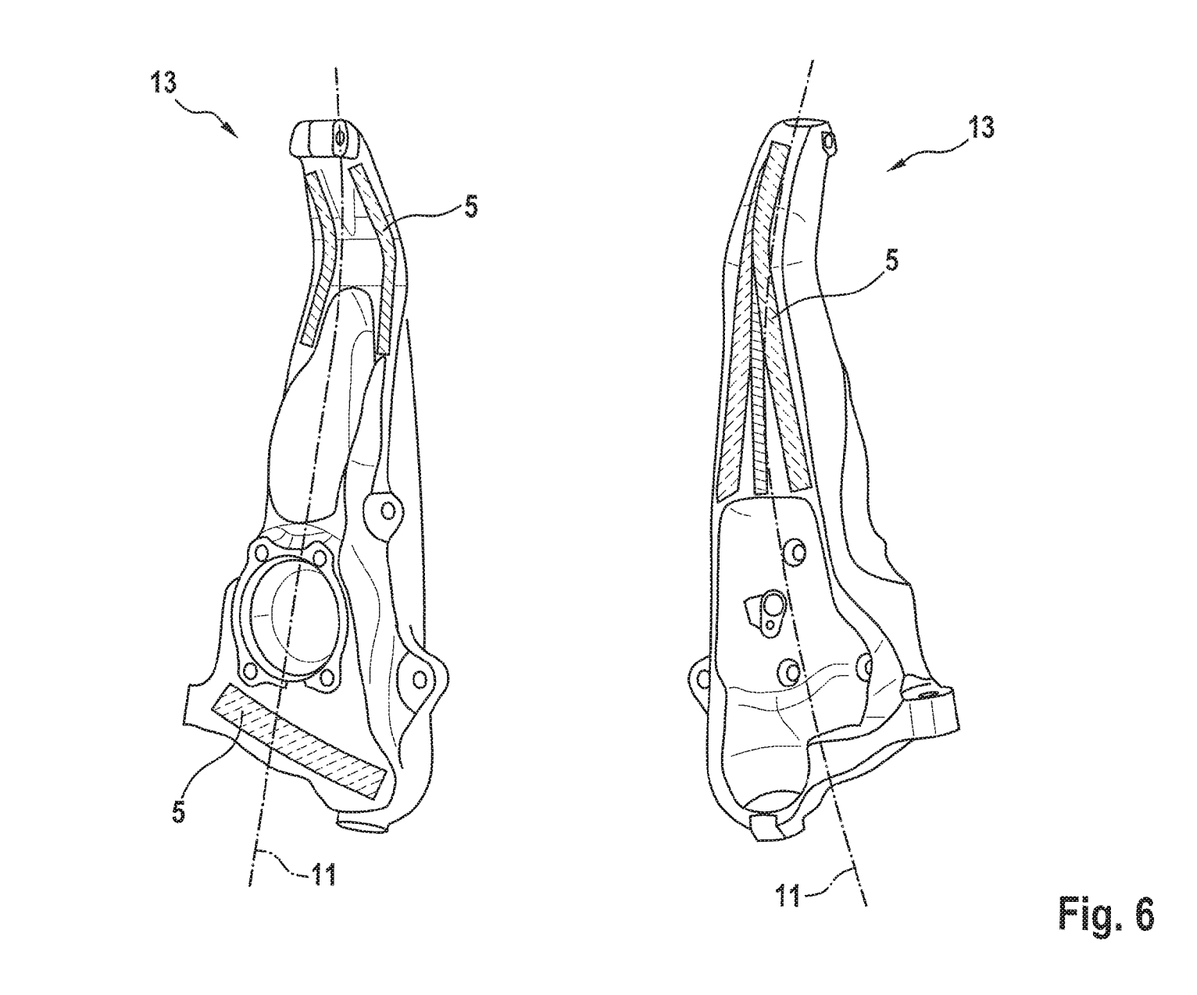
FIG. 6 shows a pivot bearing of a chassis in two views.

FIG. 3 shows a configuration of the axle carrier 2 as a front axle carrier. As in the case of the rear axle carrier, it is also possible, in the case of the front axle carrier, for the longitudinal member 3 and the cross member 4 to be locally stiffened with reinforcing elements 5 according to the invention. On a front axle carrier, the reinforcing elements 5 serve in particular for scaling the mechanical properties such as stiffness or strength, the acoustic transmission behavior or the crash behavior of the motor vehicle.

Figure 7:
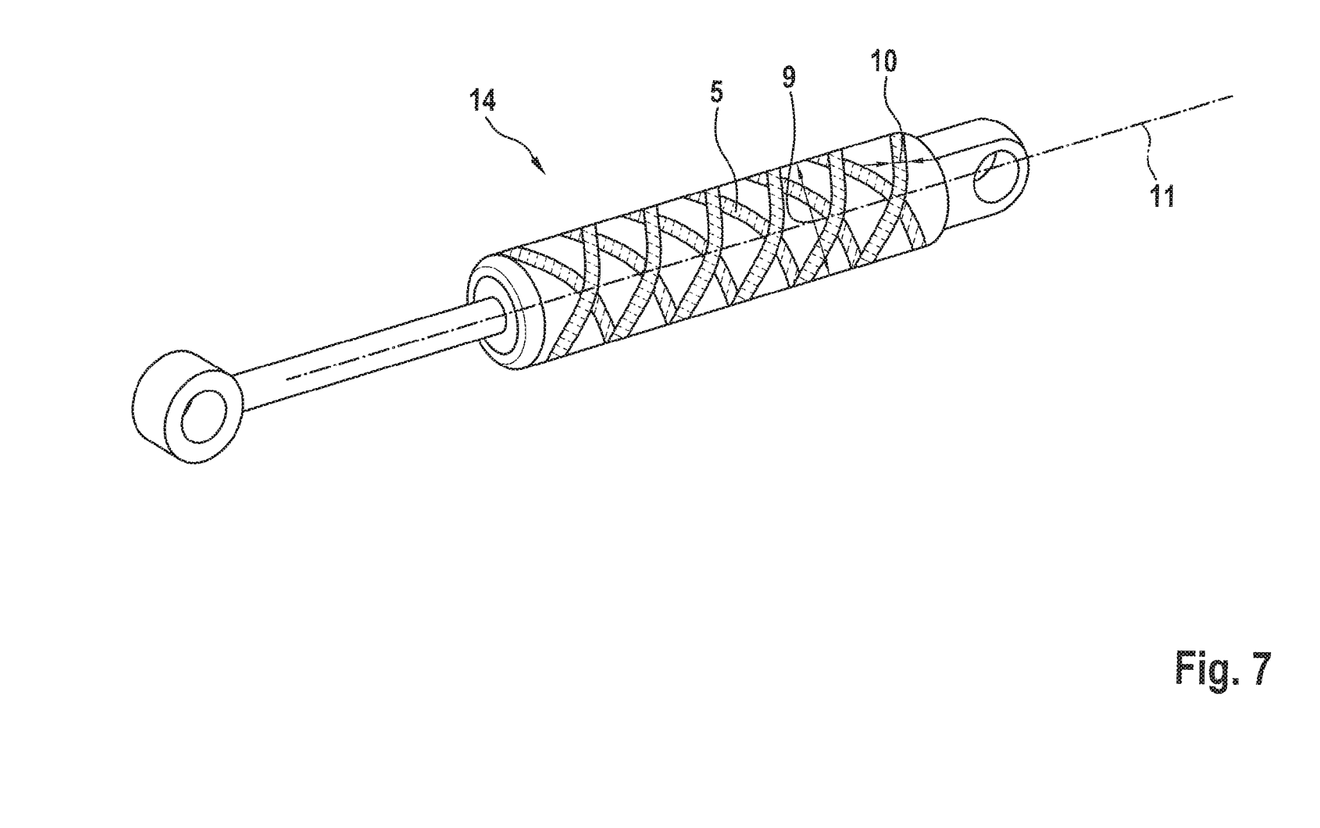
FIG. 7 shows a vibration damper designed in accordance with the invention.

FIGS. 4 to 7 show examples of wheel attachment components, namely a triangular transverse link 8 (FIG. 4), a 2-point link 12 (FIG. 5), which can be used for example as a longitudinal link, a pivot bearing 13 (FIG. 6) in two views, and a vibration damper 14 (FIG. 7). These components or parts 8, 12, 13, 14 consist of a metal material and are reinforced with reinforcing elements 5 according to the invention having a fiber-reinforced metal matrix. In the case of the vibration damper 14, the damper tube thereof is wrapped externally with reinforcing elements 5.

On the links 8, 12 and the pivot bearing 13, the reinforcing elements 5 serve in particular for scaling the mechanical properties, for example stiffness, strength and load at failure. On the damper 14, the reinforcing elements 5 serve in particular for increasing the burst pressure which is decisive for example for when the vehicle travels over obstacles.

The abovementioned reinforced profiled components 3, 4, 8, 12, 13, 14 of the chassis 1 each have a longitudinal direction 11. The reinforcing elements 5, and thus also the unidirectional fibers thereof, are arranged either parallel or at an angle to the longitudinal direction 11. Thus, an inclined arrangement is located on the damper tube of the vibration damper 14 and/or on the axle carrier 2 at the transition between the longitudinal member 3 and cross member 4, wherein the inclination is in the order of magnitude of +/−(0° to 45°), preferably 25° to 65°, with regard to the circumferential direction of the (particular) tube. In the figures, a part diameter 9 or a tape width 10 of the reinforcing element 5 are partially indicated. Preferably, the tape width 10 is at most 50% of the component diameter 9.

Figure 8:
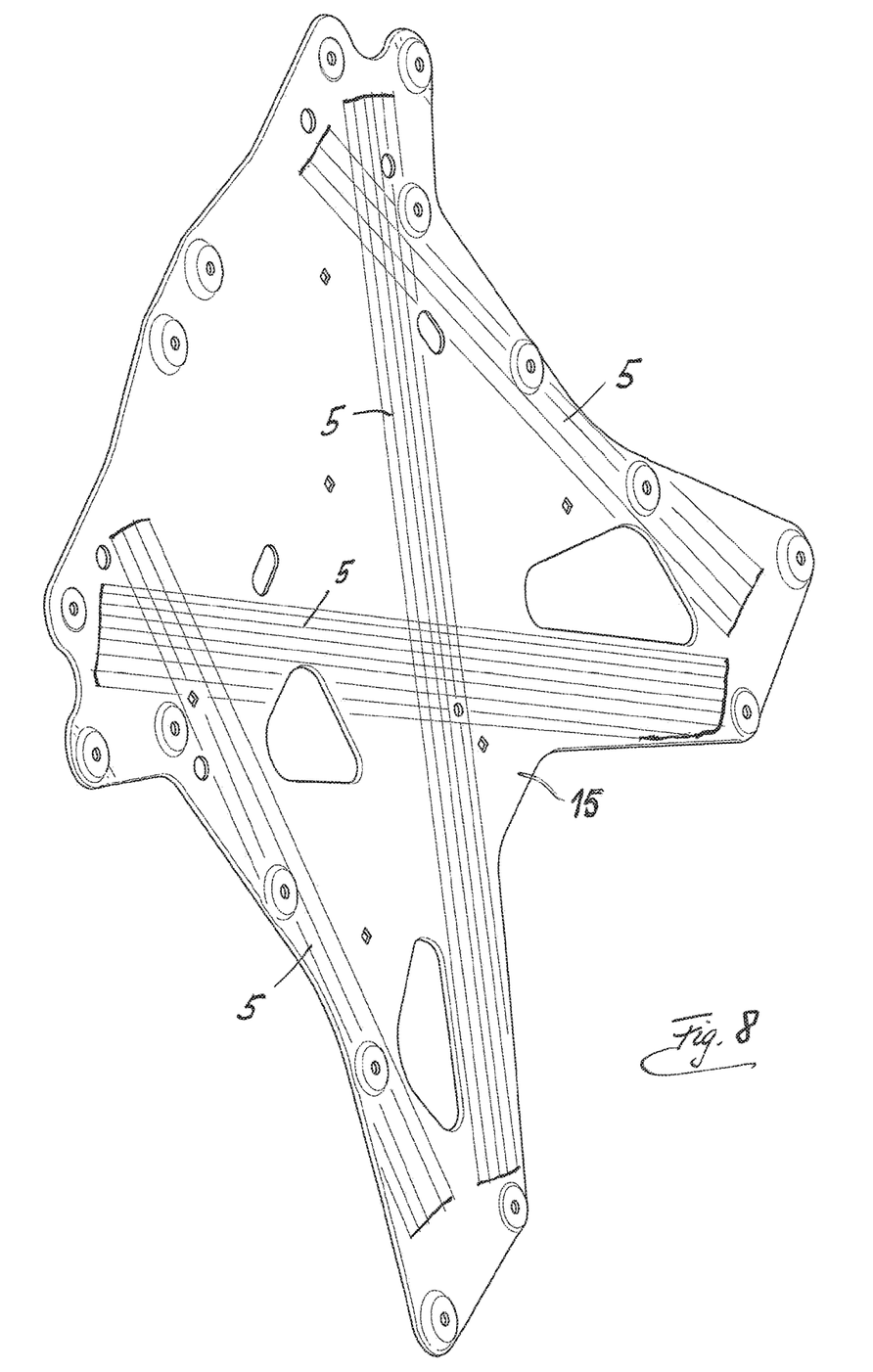
FIG. 8 shows a shear panel reinforced in accordance with the invention (and already mentioned above), for example for stiffening an axle carrier.

FIG. 8 shows a shear panel 15 known in principle to a person skilled in the art, in particular for stiffening an axle carrier in a manner fastened to the latter and/or to the bottom structure of the vehicle structure, as a chassis part according to the invention in a perspective illustration. Attached to this two-dimensional metal shear panel 15 are locally tape-shaped reinforcing elements 5, which are formed by reinforcement fibers embedded in a metal matrix. Two such reinforcing elements 5 are provided in a manner extending substantially in the vehicle longitudinal direction in the installed state in the two peripheral regions of the shear panel 15, and two further tape-shaped reinforcing elements 5 extend at least approximately as diagonals of the approximately rectangular shear panel 15. The orientation of the reinforcement fibers is in this case, as illustrated by the plurality of parallel straight lines in the particular reinforcing element 5, in each case in the longitudinal direction of the tape-like reinforcing elements 5. The extension directions thereof are the main loading directions of a (conventional) shear panel inter alia in the case of a vehicle crash. It is particularly advantageous in this exemplary embodiment that individual reinforcing elements partially overlap by intersecting.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of using an identical part formed of a metal material that absorbs or transmits forces in a chassis of different motor vehicles, and a tape-shaped reinforcing element formed of a fiber-reinforced metal matrix that is applied to a surface of the part via thermal joining, the method of using comprising the steps of:
   for motor vehicles differing in terms of weight and/or drive power, in a first motor vehicle type having a higher weight and/or greater drive power, applying the tape-shaped reinforcing element to at least one surface portion, forming a load path, of said part, wherein said part is underdimensioned for use in the chassis of the first motor vehicle type without the applied tape-shaped reinforcing element; and
   in a second motor vehicle type having a lower weight and/or lower drive power, either: (i) not applying the tape-shaped reinforcing element at all to said part, or (ii) applying a tape-shaped reinforcing element of a smaller size to the part of the second motor vehicle type, wherein said part is dimensioned for use in the chassis of the second motor vehicle type without the tape-shaped reinforcing part or only with the smaller size tape shaped-reinforcing element.

2. The method according to claim 1, wherein
   the part is used in a chassis which comprises an axle carrier having at least two longitudinal members and at least one cross member connecting said two longitudinal members, wherein
   the tape-shaped reinforcing element is applied by thermal joining to one or more of the: two longitudinal members, the at least one cross member, and a shear panel that stiffens the axle carrier.

3. The method according to claim 2, wherein the chassis further comprises a wheel attachment component for an articulated connection of a wheel of the vehicle to the axle carrier and/or to a body of the vehicle, wherein
   the metal part having the tape-shaped reinforcing element applied by thermal joining is or has a part of the wheel attachment component.

4. The method according to claim 2, wherein
   the tape-shaped reinforcing element is formed by a hybrid-yarn semifinished product which, in addition to reinforcement fibers, has metal-matrix forming fibers made of a metal material.

5. The method according to claim 2, wherein
   the tape-shaped reinforcing element is applied via ultrasonic additive manufacturing.

6. The method according to claim 1, wherein
   the tape-shaped reinforcing element is further connected in a form-fit manner to the part that absorbs or transmits forces.

7. The method according to claim 1, wherein
   reinforcement fibers of the tape-shaped reinforcing element are either carbon fibers, ceramic fibers, consist of glass, or a metal material different than a metal matrix of the reinforcing element.

8. The method according to claim 1, wherein
   the tape-shaped reinforcing element contains, in addition to the metal material forming the metal matrix, substantially only reinforcement fibers embedded in the metal matrix.

\* \* \* \* \*